United States Patent [19]

Kimmell

[11] 3,968,932

[45] July 13, 1976

[54] APPLICATOR

[76] Inventor: Ardean Kimmell, Rte. 3, DeLeon, Tex. 76444

[22] Filed: Nov. 3, 1975

[21] Appl. No.: 627,944

[52] U.S. Cl. ............................. 239/142; 23/272.7; 137/101.11; 137/268; 137/599.1; 239/317; 239/430
[51] Int. Cl.² .............................................. B05B 7/24
[58] Field of Search .......... 239/142, 146, 148, 212, 239/268, 273, 310, 317, 373, 407, 418, 424.5, 430; 137/101.11, 268, 599.1; 23/272.7, 272.8; 295/99

[56] References Cited
UNITED STATES PATENTS

| | | | |
|---|---|---|---|
| 1,409,248 | 3/1922 | Sevcik | 23/272.8 |
| 2,462,034 | 2/1949 | Zeck | 239/142 X |
| 3,351,290 | 11/1967 | Baldwin | 239/276 |

FOREIGN PATENTS OR APPLICATIONS

| | | | |
|---|---|---|---|
| 76,231 | 12/1947 | Czechoslovakia | 23/272.8 |

Primary Examiner—John J. Love
Assistant Examiner—Andres Kashnikow
Attorney, Agent, or Firm—James C. Fails

[57] ABSTRACT

An applicator for applying chemicals to the soil and the like characterized by a section of main tubular conduit for being connected into a conventional farm irrigation line; a main container disposed adjacent the tubular conduit and having respective filling and draining ports; a fluid inlet conduit disposed along the bottom of the main container for spraying water onto the bottom and keeping the chemicals agitated; an effluent conduit for conducting the fluid containing the chemicals into the main tubular conduit; and an admixing nozzle means connected with the terminal end of the effluent conduit interiorly of the main tubular conduit. The admixing nozzle means has an inlet chamber with a plurality of apertures and a flaring skirt portion that are directed downstream and extend radially outwardly to within a critical distance of the walls of the conduit sufficient to cause turbulence downstream of the apertures and a back pressure on the fluid inlet conduit for achieving a substantially uniform admixture of the chemicals at widely varying pressures and flow rates.

14 Claims, 4 Drawing Figures

U.S. Patent  July 13, 1976  3,968,932
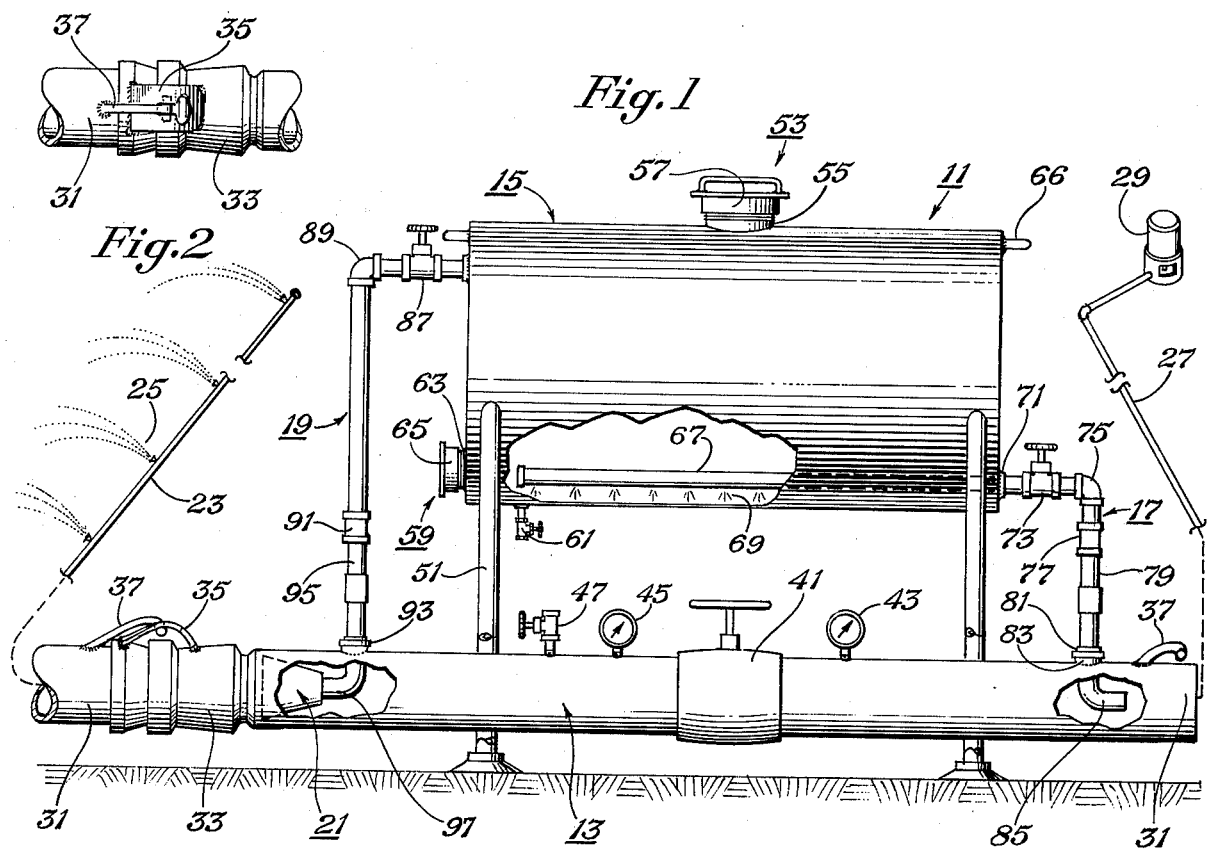
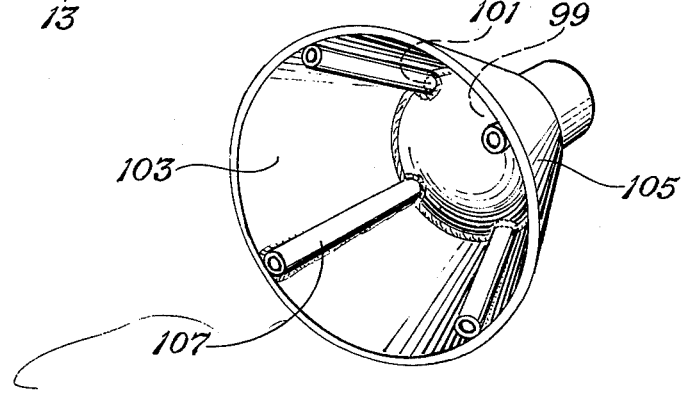

APPLICATOR

BACKGROUND OF THE INVENTION

1. Field of the Invention

This invention relates to apparatus for applying chemicals; and, more particularly, to an applicator for applying agriculturally oriented chemicals to soil, crops, and the like where an irrigation system is employed. Specifically, this invention relates to an applicator for applying fungicides, fertilizers, and the like via sprinklers on an irrigation system.

2. Description of the Prior Art

The prior art has seen a wide variety of application devices, or applicators, for applying chemicals for a wide variety of purposes. Even in the field of agriculture where chemicals are to be applied to soil, crops, and the like, there have been a wide variety of applicators depending upon the nature of the chemicals. For example, tractor mounted containers with conduit leading to plows and the like have been employed for applying certain chemicals such as anhydrous ammonia and liquid suspensions of relatively insoluble chemicals. Other forms have seen aerial spray devices employed, as from tractors, low flying planes, helicopters and the like. There have even been chemical proportioners for admixing chemicals into the irrigation lines so that the chemicals are sprayed with the water onto the crops and earth. Such proportioning feeders have been very expensive and have been difficultly employable where slurries, suspensions and the like of relatively insoluble chemicals were employed. In apparatus that employed agitation means, specially coated moving parts, and the like, the cost became exhorbitant and prohibitive for the average farmer who has had to watch his profit very carefully with the ever increasing costs without concomitant increase in his crop prices.

One of the problems that has plagued attemtps to provide distribution, or application, of the chemicals via an irrigation system has been the erratic application. Ordinarily, the chemicals would be dispensed in the first few sprinkler heads unless a proportioning feeder was employed. Thus, no inexpensive method of applying chemicals via a sprinkler system has been provided.

SUMMARY OF THE INVENTION

Accordingly, it is an object of this invention to provide an applicator that can be employed to dispense chemicals via an irrigation system including sprinkler heads and that obviates the disadvantages of the prior art.

Specifically, it is an object of this invention to provide an applicator that is economical, readily manufactured, trouble-free in operation, yet capable of dispensing a substantially uniform admixture of chemicals over substantially the entire area being irrigated and can handle corrosive and erosive suspensions and the like.

These and other objects will become apparent from the following descriptive matter, particularly when taken in conjunction with the appended drawings.

In accordance with this invention, there is provided an applicator that will enable effecting a substantially uniform application of chemicals to the soil, crops and the like by employing an irrigation system having a plurality of sprinkler heads. The applicator comprises a section of main tubular conduit having at its respective ends connection means for being connected into an irrigation line having a plurality of sprinklers connected with a source of pressurized water. Closely disposed adjacent the tubular main conduit is a main container that has a fill means for filling it and a drain means for draining it. A fluid inlet conduit is disposed linearly within the main container adjacent the bottom for conducting water from the main tubular conduit into the container. The fluid inlet conduit sealingly penetrates through the wall of the main tubular conduit and is connected with the interior thereof and has spray means for maintaining normally insoluble chemicals in a relatively uniform suspension in the water being flowed through the main container. An effluent conduit is sealingly connected with the main container for conducting the effluent fluid containing the chemicals, from the main container into the tubular main conduit for being dispensed via the sprinkler heads. Preferably, the effluent conduit communicates with the interior of the conduit, being sealed at its point of penetration through the side wall thereof, and has an admixing nozzle means connected with its terminal end interiorly of the tubular main conduit. The admixing nozzle means has an inlet chamber and a plurality of apertures adjacent a flaring skirt portion. The nozzles and flaring skirt portion are directed downstream. The flaring skirt portion extends radially outwardly to within a critical distance of the side walls. The distance is sufficiently small to cause turbulence immediately downstream of the apertures and the flaring skirt portion, and adequate to effect the back pressure on the fluid inlet conduit sufficient to uniformly admix the chemicals with the water flowing through the container. By use of the admixing nozzle means, a substantially uniform admixture of the chemicals in the water is effected at widely varying pressures and flow rates. Expressed otherwise, the use of the admixing nozzle means, in conjunction with the fluid inlet conduit and its spray means, effects a substantially uniform admixture of the chemicals with water being flowed through the tank and the amount of water being flowed through the tank is substantially proportional to the amount being flowed through the line such that a more nearly uniform admixture of chemicals is effected by this economical apparatus than has been possible heretofore with economical apparatus of the prior art.

In a specific preferred embodiment, the admixing nozzle means comprises an inlet chamber with apertures connected to tubes that traverse longitudinally downstream to the edge of the flaring skirt portion and the flaring skirt portion comprises a frusto-conical section.

Preferably, also, the tubular main conduit has a valve means with pressure gauges on each side in order to establish an artificial pressure gradient for flushing out the main container.

BRIEF DESCRIPTION OF THE DRAWINGS

FIG. 1 is a side elevational view of the applicator according to one embodiment of this invention.

FIG. 2 is a top view of a typical connection means of FIG. 1.

FIG. 3 is a partial cross sectional view showing the admixing nozzle means in accordance with the embodiment of FIG. 1.

FIG. 4 is an isometric view of the admixing nozzle means of FIG. 3.

DESCRIPTION OF PREFERRED EMBODIMENT(S)

Referring to FIG. 1, there is illustrated a preferred embodiment of the applicator 11. The applicator 11 includes a section of main tubular conduit 13, a main container 15, a fluid inlet conduit 17, an effluent conduit 19 and an admixing nozzle means 21.

The section of main tubular conduit 13 has at its respective ends connection means for being connected into an irrigation line 23 having a plurality of sprinklers 25 connected, as by conduit 27, with a source of pressurized water, such as pump 29. The tubular conduit 13 is formed of the material of which the irrigation line 23 is made. Typically, this will be a metal, such as aluminum; although plastic pipe, such as polyvinyl chloride pipe or poly butylene pipe; can be employed if desired.

The respective connection means will be those connection means that are conventionally employed in connecting the respective segments, or sections, of conduit to make up the irrigation line 23. A typical such connection means for aluminum irrigation pipe is illustrated in FIG. 2 in which a male end 31, FIGS. 1 and 2, is sealingly inserted within a gasket (not shown) within female end 33. Ordinarily, the male and female ends are connected together via a receiving holder 35 and an engaging holder 37. As can be seen from FIG. 2, the respective receiving and engaging holders accommodate longitudinal movement of the respective sections. The cylindrical male end 31 sealingly engages the interiorly disposed gasket so as to also accommodate this relative longitudinal movement between adjacent sections so as to allow for expansion and contraction with heating, cooling, pressurized condition and unpressurized condition. The respective connection means are conventional; do not, per se, form a part of this invention; and need not be described in further detail herein.

The section of main tubular conduit 13 is preferably connected, as by threaded connection, with a main valve 41. The main valve 41 enables establishing a differential pressure between the fluid inlet conduit 17 and the effluent conduit 19, as for flushing out the chemicals from within the main container 15. In order to easily control the magnitude of the differential pressure that is induced by partially closing the main valve 41, there are provided respective upstream and downstream pressure gauges 43 and 45 adjacent the main valve 41. This enables even an inexperienced and unskilled person to set the desired differential pressure; such as from 6 to 15 pounds per square inch (psi) between the gauges by closing down the main valve 41. The section of main tubular conduit also has an auxiliary valve 47 that merely increases the flexibility of making available water in the field, as by connecting a hose thereto, or inserting material in the tubular main conduit 13. Any of the conventional available valves may be employed for the main valve 41 as long as its fastening means are compatible with the fastening means on the ends of the section of conduit 13 with which it sealingly connects. For example, conventional aluminum valves are available that can be screwed onto the aluminum conduit. These valves may be globe valves, gate valves, any of the other conventionally available valves. Similarly, the pressure gauges and the smaller valves may be any of the conventional gauges and valves that are employed in this art. Ordinarily, the pressure gauges need not be greater in range than about 100 pounds per square inch gauge (psig).

Thus, as can be seen from the foregoing, the section of main tubular conduit 13 is adapted for either receiving chemicals from the main container 15, or flushing out the main container 15 to prevent corrosion and the like.

The main container 15 is disposed adjacent the main tubular conduit 13. The main container 15 may be of any appropriate size as desired for the particular chemicals. It has been found appropriate to use vessels that are able to contain pressure up to about 100 psig and are sized from about 50 gallons to as much as 250 gallons or more. These sizes are readily transportable by equipment that the farmer has. Larger sizes can be employed if the user has equipment to handle tanks of 500–1,000 gallon capacity and larger. The main container 15 may take any of the conventional shapes, such as spherically shaped containers, horizontal cylinders, or the like. As illustrated, the main container 15 comprises an enclosed horizontal cylindrical vessel. The main container 15 may be formed of any material that will withstand the pressure, as indicated. Ordinarily, it is advantageous to employ metals to form the tank in order to withstand the rough handling and the like that plastic cannot withstand. Of the metals, it is ordinarily preferable to employ the more resistant metals, such as the iron alloys like steel. As illustrated, the main container 15 has the ends welded thereinto, although they may be affixed by any suitable means such as by being bolted onto flanges or the like.

The main container 15 has a plurality of handling means, such as handles 66, that are welded thereto, as for lifting by crane, A-frames on a tractor or the like.

The main container 15 is connected, as by welding, with a suitable base, such as the base framework 51. The base framework 51 may comprise a plurality of legs with or without cross members for supporting the section of main tubular conduit 13. Ordinarily, it may be advantageous to provide a skid on the base framework 51 so that the applicator can be towed into position by a tractor or the like, or otherwise readily hauled onto a truck. The main container 15 must not only be able to dispense the chemicals but must be able to be filled and drained.

Consequently, a fill means 53 is disposed adjacent the top of the main container 15 and communicates with the interior thereof for filling the main container with the chemicals to be applied to the soil. As illustrated, an aperture, or port, and screw fitting, or neck, 55 are disposed on the top of the main container 15; and a threaded cap 57 is screwed thereonto. The threaded cap 57 can be removed for adding chemicals or the like to the main container 15. If desired, of course, the cap can be bolted onto flanges or otherwise affixed.

A drain means 59 is disposed adjacent the bottom of the main container and connected with the interior thereof for draining the main container. As illustrated, the drain means 59 comprises both a valve 61; and an aperture and screw fitting, or neck, 63, with a threaded cap 65, similarly as described with respect to the fill means 53. Thus, the main container 15 can be drained, or can be filled with chemicals ready for being dispensed responsive to flow of water therethrough.

In order to help effect the flow of water therethrough, a fluid inlet conduit 17 is disposed linearly of the main container adjacent the bottom for conducting water into the main container. Specifically, the fluid inlet conduit includes a conduit section 67 that is disposed adjacent the bottom of the main container 15 with a plurality of spray means 69 directed toward the bottom of the main container 15 for maintaining the chemicals agitated in the water within the main container. The agitation may be for getting the chemicals into solution or maintaining a more nearly uniform suspension where the chemicals are relatively less soluble in the water. The spray means may take the form of simple apertures that open toward the bottom, such as holes drilled through the side wall of the conduit 67, or may comprise individual spray nozzles that can be removed to facilitate cleaning. The conduit section 67 will ordinarily be a metallic conduit or other type having sufficient rigidity to be maintained in place without deformation through cold flow or the like. As illustrated, the conduit section 67 penetrates sealingly through the end of the main container 15, the sealing being indicated by the weld 71. The fluid inlet conduit 17 also includes threadedly connected together, a valve 73, an elbow 75, and suitable couplings, nipples and unions 77, 79 and 81, to facilitate interconnection between the main container 15 and the main tubular conduit 13. The specific arrangement of the fittings in the fluid inlet conduit 17 will vary depending upon the position and distance between the main container 15 and the main tubular conduit 13 and the respective distances and sizes of the elements making up the fluid inlet conduit. Of course, if desired, the respective elements can be welded in place; but, ordinarily, it is advantageous for the farmer to have screw fittings or other designs that can readily be disassembled for replacement of individual parts as necessary for economy and continuity of operation.

It is important that the fluid inlet conduit 17 communicate interiorly of the main container 15 and of the main tubular conduit 13. As illustrated, the fluid inlet conduit 17 penetrates sealingly through the side wall of the main tubular conduit 13, indicated by the weld 83 and has at its inlet end an ell arrangement 85 that has its open end facing into the direction from which the water will flow in order to obtain a ram effect and use the kinetic energy of the water to assist in spraying onto the bottom of the container 15 and maintaining the agitation of the chemicals within the main container 15. Ordinarily, the respective elements in the fluid inlet conduit 17 will be formed of the same metallic components, such as iron, as is the main container 15. If desired, aluminum or plastic can be employed in order to prevent the formation of electrolytic cells that worsens the corrosion in respective portions. Ordinarily, the respective electrolytic interconnection between the elements do not exist continuously, so the electrolytic corrosion is not a severe problem such that the container may be of steel, along with the pipe fittings, whereas, the main tubular conduit 13 may be of aluminum.

The effluent conduit 19 is sealingly connected with the main container for conducting fluid containing the chemicals therein into the main tubular conduit 13. The effluent conduit 19 extends into, sealingly penetrates through the side wall of the tubular main conduit and communicates at its terminal end with the interior of the main tubular conduit for dispensing the chemicals thereinto. Specifically, the effluent conduit 19 incldues suitable fittings, such as valve 87, elbow 89, suitable couplings 91, union 93 and nipples 95 suitably interconnecting the respective elements of the effluent conduit, as by threaded connections. As illustrated, the effluent conduit 19 is connected near the top of the main container 15 and has, at its terminal end, an elbow arrangement 97 that includes a threaded connection. The respective elements of the effluent conduit are similar to those described hereinbefore with respect to the fluid inlet conduit. The threaded connection on the elbow arrangement 97 is directed downstream and facilitates attaching an admixing nozzle means for more nearly uniform distribution of the chemicals than has been possible heretofore.

The admixing nozzle means 21 is connected with the terminal end of the effluent conduit, as by matingly engaging the threaded connections on the elbow arrangement 97, FIG. 3. The admixing nozzle means 21, FIGS. 3 and 4, includes an inlet chamber 99 and a plurality of apertures 101 for dispensing the fluid containing the chemicals. The admixing nozzle means 21 includes a flaring skirt portion 103 that is directed downstream and extends radially outwardly to within a predetermined critical distance $d$ of the side wall of the main tubular conduit 13. The distance $d$ is sufficient to cause turbulence immediately downstream of the apertures or any tubes to which they are connected for mixing the chemical suspension into the water flowing through the main tubular conduit 13. The distance $d$ is also sufficiently small to cause sufficient back pressure on the fluid inlet conduit 17 adequate to effect substantially uniform admixture of the chemicals at widely varying pressures and flow rates through the main tubular conduit 13. The distance $d$ will vary depending upon the size of the conduit and the flow rates therethrough. For all the flow rates for which tests have been made, it must be within 1 inch of the walls of the main tubular conduit 13. It has been found advantageous to employ a distance $d$ of about one-half inch for the irrigation conduit with which the applicator has been employed in the southwestern United States.

Specifically, the flaring skirt portion in the illustrated embodiment comprises a frusto-conical section 105, FIG. 4, that flares downstream. The respective apertures 101 are connected with tubes 107 that terminate adjacent the downstream end of the frusto-conical section 105 for most advantageously effecting admixture of the liquid containing the chemicals with the water flowing through the main tubular conduit 13.

Table I illustrates outside diameters in inches of the frusto-conical section 105 adjacent the ends of the tubes and the respective size irrigation lines in which they are employed.

Table I

| Outside Diameter of Frusto-Conical Section 105 | Nominal Diameter of Main Tubular Conduit and Irrigation Line |
| --- | --- |
| 5 | 6 |
| 4 | 5 |
| 3 | 4 |

The 2–4 inch pipe have a nominal wall thickness of 0.050 inch; the 5 inch irrigation pipe has a wall thickness of 0.052 inch and the 6 inch pipe has a wall thickness of 0.058 inch.

It is preferred that the tubes 107 have an angle $\theta$ with respect to the longitudinal axis of the main tubular conduit 13 within the range of about 20°–45° in order to effect optimum flow of the fluid containing the chemicals therethrough and into the water to be mixed via the turbulence immediately downstream of the frusto-conical section 105.

For reasons that are not completely understood, the combination of the admixing nozzle means and the remainder of the applicator effects a substantially uniform admixture of chemicals at widely varying pressures and flow rates in widely varying applications ranging from relatively lower pressure wells supplying relatively short irrigation lines through large volume high pressure pumps supplying much longer irrigation lines up to one-half mile and more in length.

The admixing nozzle means 21 may be formed of any materials that are appropriate to the pressure drops to be employed. While certain plastics could probably be employed, it has been found advantageous to form the admixing nozzle means of metal. In this way, the interconnection of the tubes and interior walls of the inlet chamber or the like can be readily welded into place and threads readily formed for joinder to the elbow arrangement 97. Of course, some of the newer plastic pipe, such as the polybutylene pipe, polyvinyl chloride pipe and the like, can be employed, even though they are not as durable. The plastics are particularly advantageous where the chemicals are unusually corrosive to metal.

The type of chemicals that are employed with this applicator will vary widely. Ordinarily, it is less effective in applying chemicals that have relatively high vapor pressure or tend to allow desirable constituents to escape, such as anhydrous ammonia. Moreover, certain chemicals may be controlled by regulatory agencies and the user should, of course, heed such regulator agencies. The chemicals may form true solutions or may form abrasive slurries that would foul conventional pumps, or cause severe corrosion and erosion. Typical of the chemicals that can be employed are ammonium nitrate-urea (available as Solution 32), ammonium nitrate, urea (although there may be a potential ammonia loss), ammonium sulfate, calcium nitrate, potassium nitrate, liquid ammonium phosphates, some dry ammonium phosphates, ThioSul (nitrogen-sulfur compounds), potassium chloride (although this may be difficult to dissolve rapidly), potassium sulfate (although this may be hard to dissolve rapidly), and suspension fertilizers. Moreover, secondary and micronutrients can be applied through the sprinkler system. These include magnesium sulfate; zinc sulfate, zinc chelates; manganese sulfates, manganese chelates; copper sulfate, copper chelates; iron sulfate, iron chelates; Solubor (boron compound); and molybdenum. A wide variety of other chemicals including pesticides, fungicides, weed control agents and the like can be employed, although care should be taken. Typically, these are chemicals such as Terrachlor, a liquid for controlling nematodes, and copper oxide-sulfur suspensions for controlling leaf spot on peanuts. There are a plurality of articles available on the wide variety of chemicals that can be advantageously applied to the soil or the like through irrigation systems with a plurality of sprinkler heads.

The following Example illustrates an applicator that has been found to perform satisfactorily in applying a variety of chemicals in the central Texas region.

EXAMPLE

The applicator was constructed as delineated hereinbefore and used in conjunction with 3–6 inch irrigation lines. Early attempts to employ the applicator without the admixing nozzle resulted in erratic application of the chemicals. When the main valve 41 was set to effect 15 psi differential pressure thereacross, the chemicals were dispensed only in the first 10 sprinkler heads out of some 65 sprinkler heads on a ½ mile irrigation line. The differential pressure was lowered to only 6 psi and the chemicals were dispensed in the first 25 sprinkler heads and were nonuniformly applied, the earlier heads getting the chemicals. When the described and illustrated applicator was employed, the chemicals were dispensed over a 30 minute period and all 65 sprinkler heads obtained a uniform spray of the chemicals. In fact, when a dye was employed in the applicator system to check the application, the dye could be seen travelling down the sprinkler heads during the initial installation, throughout the dispensing of the dye followed by the clear water displacing the dye through the initial sprinklers, just as the dye had initially been displaced throughout the sprinklers such that there was a uniform application at all sprinkler heads.

Moreover, this uniform application was effected in a wide variety of different pressures and a wide variety of flow rates.

In the exemplified applicator, the main tubular conduit 13 was formed of aluminum while the main container 15 was formed of steel with wrought iron pipe interconnections. The admixing nozzle means was formed of welded steel.

Where the term "welding" has been employed herein, silver soldering or other equivalent methods of effecting sealing interconnection can be employed.

Also, any connection means may be employed where the threaded connection means are specifically described herein.

From the foregoing, it can be seen that this invention achieves the objects delineated hereinbefore; and, specifically, provides an economical applicator that can be readily transported and used by even a small farmer without adversely affecting profits. Thus, the invention alleviates the high expense of the prior art type methods and apparatus for applying chemicals to the soil and the crops.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. An applicator for applying chemicals to soil and the like comprising:
    a. a section of main tubular conduit having at its respective ends connection means for being connected into an irrigation line having a plurality of sprinklers connected with a source of pressurized water;
    b. a main container disposed adjacent said main tubular conduit;
    c. fill means for filling said main container with said chemicals to be applied to said soil; said fill means being disposed adjacent the top of said main container and communicating with the interior thereof;
    d. drain means for draining said main container; said drain means being disposed adjacent the bottom of said main container and communicating with the interior thereof;
    e. fluid inlet conduit disposed linearly of said main container adjacent the bottom thereof for conducting water into said main container; said fluid inlet conduit having spray means directed toward the bottom of said main container for maintaining said chemicals agitated in said water within said main container; said fluid inlet conduit extending into, sealingly penetrating through side walls of and communicating with the interior of said main tubular conduit for conducting water therefrom;
f. effluent conduit sealingly connected with said main container for conducting fluid containing said chemicals therein into said main tubular conduit; said effluent conduit extending into, sealingly penetrating through side walls of, and communicating at its terminal end with the interior of said main tubular conduit for dispensing certain chemicals thereinto;
g. admixing nozzle means connected with said terminal end of said effluent conduit within said main tubular conduit for effecting dilute, substantially uniform admixture of said chemicals at widely varying flow rates and widely varying pressures; said admixing nozzle means including an entry chamber having a plurality of apertures for dispensing said fluid containing said chemicals, and having a flaring skirt portion directed downstream and extending radially outwardly to within a distance of said side walls of said main tubular conduit sufficient to cause turbulence immediately downstream of said apertures in said admixing nozzle means and back pressure on said fluid inlet conduit adequate to effect substantially uniform admixture of said chemicals at said widely varying pressures and flow rates;
whereby substantially uniform application of said chemicals is made on a field having even large elongate dimension.

2. The applicator of claim 1 wherein said apertures are connected with tubes that extend to the downstream edge of said flaring skirt portion.

3. The applicator of claim 1 wherein said flaring skirt portion is a frusto-conical section.

4. The applicator of claim 3 wherein said apertures are connected with tubes that extend to the downstream edge of said frusto-conical portion.

5. The applicator of claim 4 wherein said tubes have their downstream portion at an angle $\theta$ within the range of 20°–45° for obtaining a most nearly uniform admixture of said chemicals at said widely varying pressures and flow rates.

6. The applicator of claim 1 wherein said flaring skirt portion extends to within one inch of said side walls of said main tubular conduit.

7. The applicator of claim 6 wherein said main tubular conduit is conventional irrigation pipe and said flaring skirt portion extends to within about one-half inch of the walls of said main tubular conduit.

8. The applicator of claim 1 wherein said fill means comprises an aperture surrounded by threaded portion and a cap screwed thereonto.

9. The applicator of claim 1 wherein said drain means includes an aperture having a threaded portion and a cap screwed thereonto.

10. The applicator of claim 9 wherein said drain means also includes a drain valve.

11. The applicator of claim 1 wherein said fluid inlet conduit has its inlet end facing into the direction from which the water will flow for a ram effect that will operate in conjunction with said flaring skirt portion for effecting most nearly uniform admixture of said chemicals at said widely varying pressures and flow rates.

12. The applicator of claim 1 wherein said main tubular conduit has a main valve disposed intermediate said fluid inlet conduit and said effluent conduit for effecting a differential pressure for flushing out said main container.

13. The applicator of claim 12 wherein pressure gages are disposed immediately adjacent said valve and communicating with the interior of said main tubular conduit such that the differential pressure can be readily controlled for obtaining the desired degree of flushing by even an unskilled operator.

14. The applicator of claim 1 wherein said main container comprises a horizontal, cylindrically shaped pressure vessel and said fluid inlet conduit extends along the bottom thereof and has a plurality of spray means directed toward the bottom of said main container.

* * * * *